(12) United States Patent
Nakai

(10) Patent No.: US 9,038,764 B2
(45) Date of Patent: May 26, 2015

(54) ELECTRICAL POWER STEERING APPARATUS

(71) Applicant: JTEKT CORPORATION, Osaka-shi, Osaka (JP)

(72) Inventor: Motoo Nakai, Nara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/100,488

(22) Filed: Dec. 9, 2013

(65) Prior Publication Data

US 2014/0174844 A1 Jun. 26, 2014

(30) Foreign Application Priority Data

Dec. 20, 2012 (JP) ................................. 2012-277961

(51) Int. Cl.
*B62D 5/04* (2006.01)
*B60K 28/14* (2006.01)

(52) U.S. Cl.
CPC ............ *B62D 5/0475* (2013.01); *B62D 5/0481* (2013.01); *B62D 5/046* (2013.01); *B60K 28/14* (2013.01)

(58) Field of Classification Search
USPC ................. 180/444, 446, 443; 701/41, 42, 43
See application file for complete search history.

(56) References Cited

U.S. PATENT DOCUMENTS 8,228,012 B2 * 7/2012 Hamasaki et al. ........ 318/400.04
8,269,443 B2 * 9/2012 Imai ......................... 318/400.23
2009/0146590 A1 * 6/2009 Hamasaki ................. 318/400.02
2010/0006360 A1   1/2010 Kishimoto
2011/0098889 A1 * 4/2011 Oya ............................... 701/41

FOREIGN PATENT DOCUMENTS

| EP | 1 900 602 A1 | 3/2008 |
| EP | 2 226 236 A1 | 9/2010 |
| JP | A-2008-143483 | 6/2008 |

OTHER PUBLICATIONS

Extended Search Report issued in European Patent Application No. 13196755.6 dated Apr. 30, 2014.

* cited by examiner

*Primary Examiner* — Joseph Rocca
*Assistant Examiner* — Marlon Arce
(74) *Attorney, Agent, or Firm* — Oliff PLC

(57) ABSTRACT

A motor control circuit includes a power relay, a converter division, a smoothing condenser, a control circuit and a motor drive circuit, and is connected to a battery as high voltage power and to an electrical motor. The battery is connected with a driving battery having the high voltage such as 288V etc. A step down circuit reduces the high voltage to a low voltage such as 36V etc., charges a low voltage charge device and supplies drive power to the motor drive circuit. When the vehicle collision is occurred, the control circuit detects the collision by a value of detected acceleration, a power change relay is turned on to change to the power source from the low voltage charge device after voltage of the smoothing condenser is reduced, thereby connecting the low voltage to the motor drive circuit.

4 Claims, 3 Drawing Sheets

ELECTRICAL POWER STEERING APPARATUS

INCORPORATION BY REFERENCE

The present application claims priority under 35 U.S.C. §119 to Japanese Patent Application No. 2012-277961, filed on Dec. 20, 2012. The contents of the application are incorporated herein by reference in the entirety.

BACKGROUND OF THE INVENTION

1. Field of the Invention

The present invention relates to an electrical power steering apparatus, especially for safety drive without any electrical shock.

2. Description of the Related Art

It is widely popular to have an electrical power steering apparatus assisting a steering operation of a driver by an electrical motor etc. in a vehicle. It is well known in the prior art such as Japanese laid-open publication 2008-143483 the electrical power steering apparatus equipped with the vehicle that has a battery such as a secondary battery or a capacitor storing high power in order to drive the vehicle that is for example an electric vehicle or a hybrid vehicle.

In the vehicle with the electrical power steering of the prior art, the high power from a large volume of the battery is sent to the electrical power steering apparatus. Where it happens an accident of the vehicle collision, it should stop sending the power to the power steering apparatus in order to avoid any possible electrical shock to the driver because of the high power. In this anticipate accident, the driver is forced the steering operation by manual without assistance of the electrical power steering apparatus, thereby it is impossible safe and smooth escape from the accident point.

SUMMARY OF THE INVENTION

In view of the previously mentioned circumstances, it is an object of the present invention to provide an electrical power steering apparatus avoiding possible electrical shock and escaping by safe and smooth steering operation by maintaining the power assist of the electrical power steering apparatus.

In order to achieve the above and other objects, one aspect of the present invention provides an electrical power steering apparatus including a high voltage power, an electrical motor generating steering assist force presented to a steering mechanism of a vehicle, a motor drive circuit including a plurality of switching elements supplying drive current to the electrical motor, a motor control circuit controlling the motor drive circuit, a power relay opening and closing a conduct between the high voltage power and the motor drive circuit, a converter division supplying power to the motor drive circuit, and a smoothing condenser absorbing any current ripple, the electrical power steering apparatus comprises the converter division including a step down circuit reducing high voltage of the high voltage power to low voltage, a low voltage charge device charged through the step down circuit, and a switch equipped to shut and connect a conduct between the low voltage charge device and the motor drive circuit, and the electrical power steering apparatus supplies the power from the low voltage charge device to the motor drive circuit at a collision of the vehicle.

By the above constructions, when the collision is occurred in the vehicle equipping the electrical power steering apparatus using the high voltage battery, the converter division changes the power source voltage supplying to the motor drive circuit from the high voltage to the low voltage of the low voltage charge device by the step-down circuit. Thereby, the operator of the vehicle does not receive the electric shock, as a result, it is certain to keep the safety drive by the operator with the operation of the electrical power steering apparatus, thereby the vehicle can be moved to a safety zone to be saved safely.

Another aspect of the present invention provides an electrical power steering apparatus wherein the control circuit discharges the voltage of the smoothing condenser by using the step down circuit and the motor drive circuit after the power relay is turned off at the vehicle collision, and turns on the switch to change to a power source from the low voltage charge device when a voltage supplying to the motor drive circuit is reduced to a predetermined low voltage. Thereby, it continues the motor drive by changing to the power source from the low voltage charge device so that it can be sure to maintain the safety of the driver.

Other aspect of the present invention provides an electrical power steering apparatus wherein the control circuit increases a current limit value of the electrical motor after changing to the power source from the low voltage charge device. Thereby, it can increase the current limit flowing to the electrical motor at the operation of the low voltage charge device, therefore it can achieve smooth operation of the steering.

Further other aspect of the present invention provides an electrical power steering apparatus wherein the control circuit detects the vehicle collision by a detecting signal from an acceleration sensor equipped on the vehicle, and turns off the power relay to close the conduct between the high voltage power and the motor drive circuit. Thereby, it shuts off the high voltage power by detecting the vehicle collision by the acceleration sensor, therefore the driver of the vehicle does not receive electric shock, so that the vehicle can be moved to a safety zone to be saved safely.

The electrical power steering apparatus according to the present invention can avoids possible electrical shock at the vehicle collision and maintains the power assist of the electrical power steering apparatus to move the vehicle to a safety zone.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

An electrical power steering apparatus installed in a vehicle according to one embodiment of the present invention will be explained hereinafter in referring to FIGS. 1 to 4.

Figure 1:
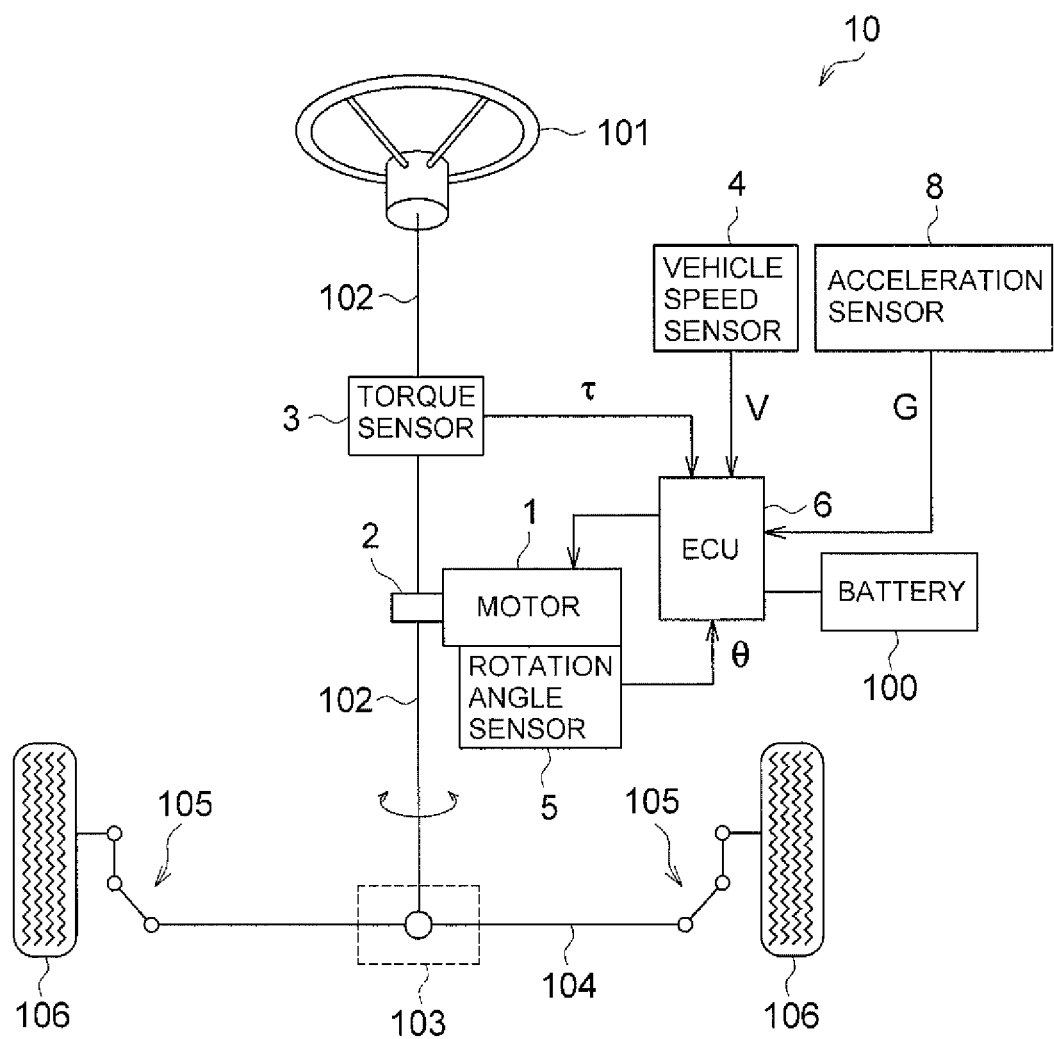
FIG. 1 is a schematic diagram of the electrical power steering apparatus according to one embodiment of the present invention.

FIG. 1 is a schematic diagram showing summary constructions of the one embodiment of the electrical power steering apparatus according to the present invention. The electrical power steering apparatus 10 includes an electrical motor 1, a reduction gear mechanism 2, a torque sensor 3, a vehicle speed sensor 4, a motor rotation angle sensor 5 (referred as the rotation angle sensor hereinafter) and an electronic control unit 6 (referred as the ECU hereinafter). The electrical power steering apparatus 10 is a column assisted type electrical power steering apparatus.

As shown in FIG. 1, a steering wheel 101 is fixed to one end of a steering shaft 102, and the other end of the steering shaft 102 is meshed with a rack shaft 104 through a rack and pinion mechanism 103. Both ends of the rack shaft 104 are respectively connected to steered wheels 106 through a connecting member 105 of tie-rods and knuckle arms. When a driver rotates the steering wheel 101 to rotate the steering shaft 102, the rack shaft 104 is reciprocated to change a direction of the steered wheels 106.

The electrical power steering apparatus 10 assists a steering operation to reduce loads to the driver by a method explained hereinafter. The torque sensor 3 detects steering torque τ loaded to the steering shaft 102 by operating the steering wheel 101. The vehicle speed sensor 4 detects a vehicle speed V. The rotation angle sensor 5 detects a rotational position θ (a motor rotational angle) of a rotor of the electrical motor 1. The rotation angle sensor 5 is constructed with a resolver.

To the ECU 6 are connected an un-illustrated steering angle sensor constructing a steering angle detection member and an acceleration sensor 8 detecting lateral directional acceleration loaded to the vehicle. The acceleration sensor 8 is a piezo-electric type or a capacitive type. The ECU 6 detects a steering angle θs and acceleration G in accordance with output signals from each of the sensors.

The ECU 6 receives power supplied from an on-vehicle battery (hereinafter referred as a battery) 100, and controls to drive the electrical motor 1 in accordance with the steering torque τ, the vehicle velocity V and the motor rotational angle θ. The electrical motor 1 generates steering assist force by being driven rotationally by the ECU 6. The reduction gear mechanism 2 is mounted between the electrical motor 1 and the steering shaft 102. The steering assist force generated by the electrical motor 1 acts to rotate the steering shaft 102 through the reduction gear mechanism 2. Where the rated power of the electrical power steering apparatus 10 has same power to the rated power of a battery for driving the vehicle as a main power source, the battery 100 is the high voltage battery supplying the power to a driving motor of an electrical vehicle or a hybrid electric vehicle.

Rotating power of the steering shaft 102 by the driver is assisted by both of the steering torque τ, added to the steering wheel 101, and the steering assist force generated by the electrical motor 1. The electrical power steering apparatus 10 achieves the steering assist by providing the steering assist force generated by the electrical motor 1 to the steering mechanism of the vehicle.

Figure 2:
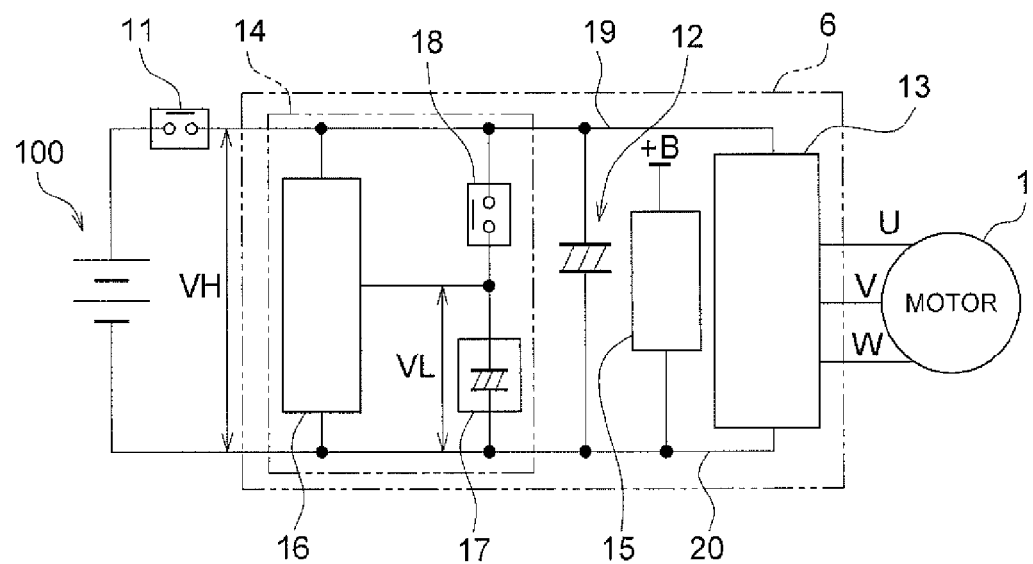
FIG. 2 is a block diagram of a motor control circuit included in the electrical power steering apparatus.

FIG. 2 is a block diagram of a motor control circuit included in the electrical power steering apparatus 10. The motor control circuit includes a power relay 11, a converter division 14, a smoothing capacitor 12, a control circuit 15, and a motor drive circuit 13. The motor drive circuit 13 is mounted within the ECU 6 and connected to the battery 100 of the high voltage and to the electric motor 1. The voltage of the battery 100 is for example more than 100 volts enough dangerous to a human body. Besides, control voltage +B as a power source of the control circuit 15 is generated from the battery 100 through a DC/DC converter and so on. The electrical voltage is for example 12V.

The electrical motor 1 is a three-phase brushless motor having three phase wires including a U-phase wire, a V-phase wire and a W-phase wire as shown in FIG. 2. The power relay 11 is positioned out of the ECU 6 and is a power switch changing to connect or not to connect the smoothing condenser 12 and the motor drive circuit 13 to the battery 100. The power relay 11 is in on-stage or conduction state when the electrical power steering apparatus 10 is in operation and in off-stage or non-conduction state when the electrical power steering apparatus 10 is not in operation. The power relay 11 is constructed to be positioned adjacent to the high voltage battery 100 in order to prevent breakage of wire of the battery 100 by collision and any possible short to vehicle body.

The motor drive circuit 13 includes un-illustrated six MOS-FETs as a switching element. These six MOS-FETs are divided into three groups of two MOS-FETs each of which is connected in series. Three groups of two MOS-FETs are connected in parallel each other between a power line 19 and an earth line 20. Each of connecting points of the MOS-FETs is connected with an end of each of the U-phase wire, the V-phase wire and the W-phase wire of the electrical motor 1. The other end of each of the U-phase wire, the V-phase wire and the W-phase wire is connected common connecting point that is a neutral point.

The control circuit 15 controls six MOS-FETs included in the motor drive circuit 13. In detail, to the control circuit 15 are input the steering torque τ, the vehicle speed V and the motor rotational angle θ. On a basis of these input data the control circuit 15 decides a target value of a target current for three phase drive circuit of the U-phase wire, the V-phase wire and the W-phase wire, and outputs a PWM signal to coincide to the target value the detected current of each phase by a current sensor. The PWM signal is supplied to a gate terminal of each of six MOS-FETs included in the motor drive circuit 13.

The smoothing condenser 12 is mounted between the power line 19 and the earth line 20. The smoothing condenser 12 registers a charge and discharges the stored charge where it is not enough amount of the current flowing from the battery 100 into the motor drive circuit 13. Therefore the smoothing condenser 12 absorbs a current ripple and functions as the condenser smoothing the power voltage driving the electrical motor 1.

Figure 3:
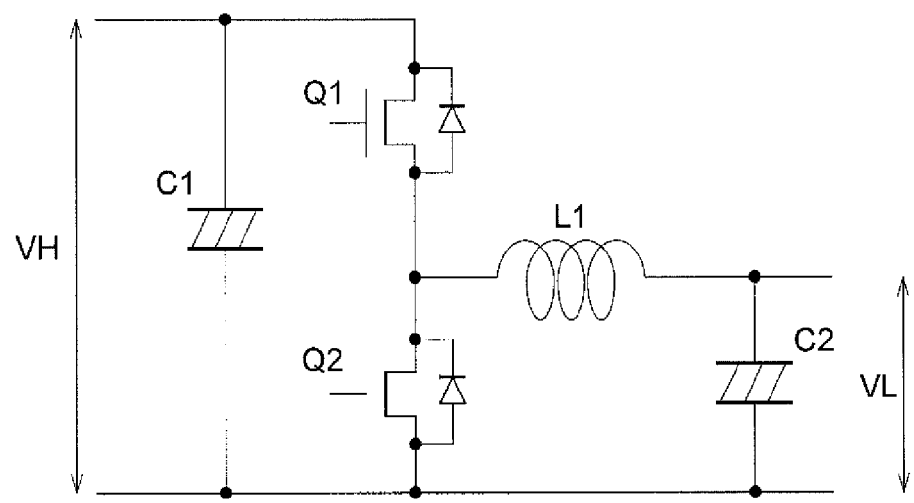
FIG. 3 is a constructive diagram of a step down circuit shown in FIG. 2.

The stored charge in the smoothing condenser 12 is discharged through a step-down circuit 16 including a switching element Q1, a circuit of a reactor L1 and the MOS-FET in the motor drive circuit 13 as shown in FIG. 3 after the power relay 11 is in OFF state in the embodiment of the power steering apparatus 1 of the present invention. In this instance, the switching element Q1 charges a low voltage charge device 17 by means of step-down transmission by the switching operation and stops flowing the current to the electric motor 1.

The converter division 14 includes the step-down circuit 16, the low voltage charge device 17 and a power change relay or switch 18. The step-down circuit 16 decreases in normal the high voltage of the battery 100 down to the low voltage through the power relay 11 and charges the low voltage charge device 17. The low voltage charge device 17 is an auxiliary power of a capacitor and so on.

To the control circuit 15 is input a signal of an acceleration G detected by the acceleration sensor 8 which is equipped on the vehicle as shown in FIG. 1. The collision of the vehicle is detected by the value of the acceleration G. The battery 100 outputs the high voltage of such as 288 volts more than 100 volts for driving a driving motor of the electrical vehicle or the hi-bride vehicle. The battery 100 is a driving battery of a nickel hydrogen battery or a lithium ion battery and so on. The step-down circuit 16 changes the high voltage of the 288 volts down to the low voltage of 36 volts. The power change relay 18 is changed to the ON stage, thereby supplying the driving power to the motor drive circuit 13. The power change relay 18 is not changed to the ON stage until the voltages of both opposite ends between a power line 19 and the earth line 20 is under the predetermined voltage even though the collision of the vehicle is detected. The power change relay 18 is defined as a switch turning on the flow of voltage from the low voltage charge device 17 to the motor drive circuit 13.

As explained above, the motor drive circuit 13 is connected directly to the high voltage from the battery 100 in normal stage, however in abnormal stage when the control circuit 15 detects the collision of the vehicle by the value of the acceleration G being output from the acceleration sensor 8, the motor drive circuit 13 is connected to the low voltage charge device 17 by being switched to the direct voltage VL in the step-down circuit 16. Since the acceleration at the collision is extremely larger than the acceleration at a quick start or a quick acceleration in normal stage, the acceleration at the collision is easily detected by the signal from the acceleration sensor 8.

FIG. 3 is a constructional diagram showing the step-down circuit in FIG. 2. The step-down circuit 16 includes a reactor L1, semi-conductor switching elements Q1, Q2 for the power (hereinafter referred as the switching elements Q1, Q2) and smoothing condensers C1, C2 (hereinafter referred as the condensers C1, C2). The switching elements Q1, Q2 are connected in series between the power line 19 and the earth line 20. The turning on or off of the switching elements Q1, Q2 is controlled by a switching control signal from the ECU 6. In the embodiment of the present invention each of the switching elements Q1, Q2 is used with a MOS-FET etc. In an interior of the switching elements Q1, Q2A is formed a parasitic diode connected in anti-parallel. One end of the reactor L1 is connected to a connection of the switching elements Q1 and Q2, and the condenser C1 is connected between the power line 19 and the earth line 20 and the condenser C2 is connected between the other end of the reactor L1 and the earth line 20.

In response to the switching control signal supplied to each of the gate terminals of the switching elements Q1, Q2 from the ECU 6 shown in FIG. 2, it is equipped alternatively one and the other of time periods, one is the period of ON-stage of the switching element Q1 only and the other is the period of OFF-stage of both of the switching elements Q1, Q2. The step-down circuit 16 decreases to the direct current voltage VL from the direct current voltage VH supplied from the battery 100 in the normal stage on the basis of the down ratio in response to the duty ratio during the ON-stage, charging the low voltage charge device 17.

Figure 4:
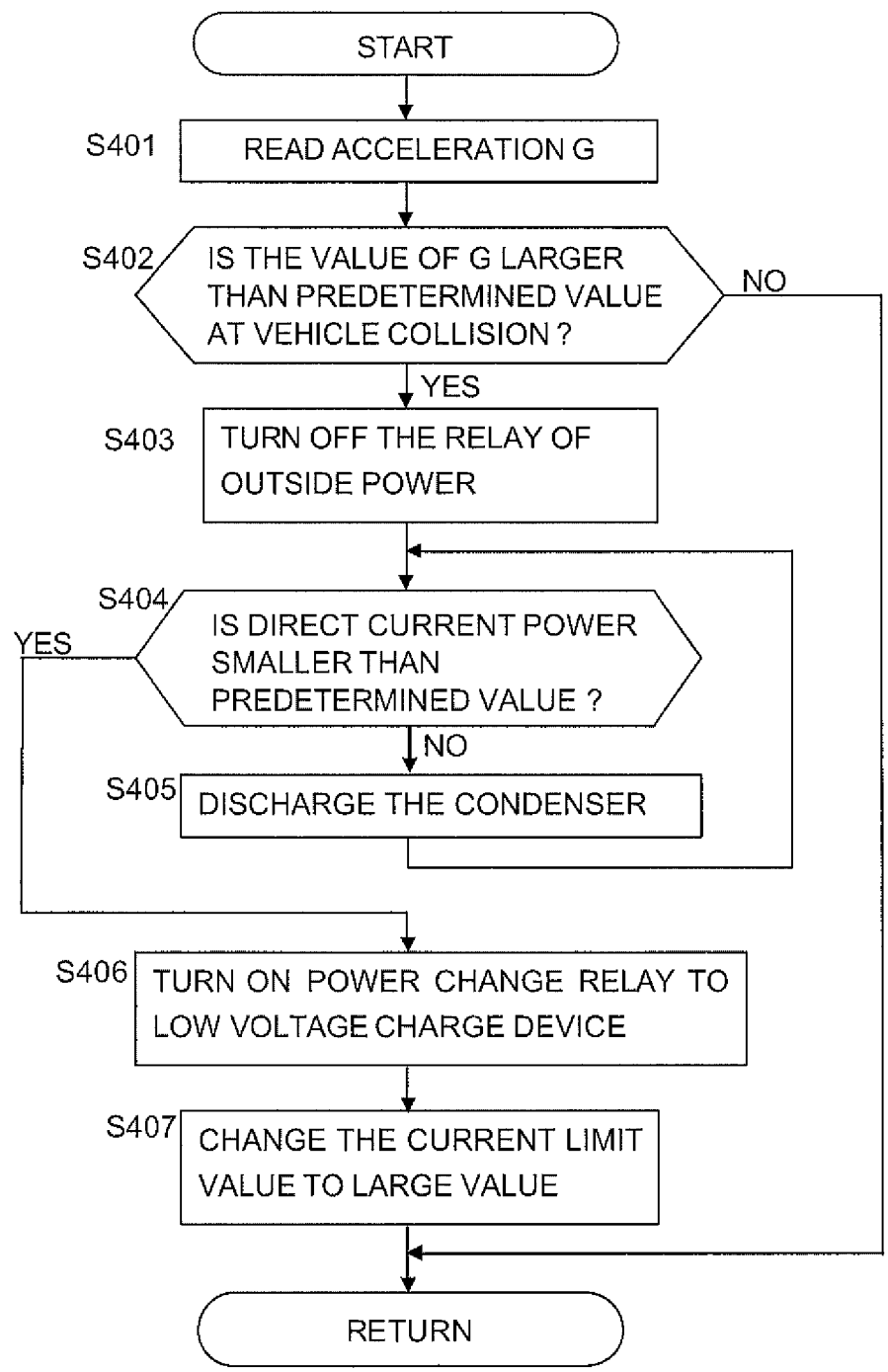
FIG. 4 is a flow chart showing a procedure of a process executed by the motor control circuit at the vehicle collision.

FIG. 4 is a flow chart showing a procedure of a process at the vehicle collision executed by the motor control circuit. In the embodiment of the present invention, the control circuit 15 executes each process at steps S401 to S407 in the flowchart shown in FIG. 4. Each process shown in the flowchart is executed each time period. As shown in FIG. 4, an un-illustrated CPU of the control circuit 15 in the ECU 6 is input the acceleration G detected by the acceleration sensor 8 in the step S401.

It is judged in the step S402 whether the detected acceleration G is larger than the predetermined value or not. In YES of the step S402 where the detected acceleration G is larger than the predetermined value, it is judged that the collision of the vehicle is occurred to go to the step S403, executing a changing process from the high voltage drive to the low voltage drive. In NO of the step S402 where the detected acceleration G is under the predetermined value, the process is ended to go out of the flow chart.

The CPU judges in the step S404 whether the direct current voltage VH of the battery 100 is smaller than the predetermined value or not. In NO of the step S404 where the direct current voltage VH of the battery 100 is over the predetermined value, the voltage of the smoothing condenser 12 is discharged through the motor drive circuit 13. In YES of the step S404 where the direct current voltage VH of the battery 100 is smaller than the predetermined value, the power change relay 18 in the converter division 14 is turned to ON to change the power line 19 to a side of the direct current voltage VL in order to achieve a degradation of the power in the step S406. Thereby, the low voltage charge device 17 is available to input the low voltage to the motor drive circuit 13.

The CPU increases the current limit value of each phase current of the electric motor 1 over the preset value at the high voltage drive after changing to the low voltage drive in the step S407, and to end the process. Thereby, it can be set the large target value of the three-phase driving current, thereby to output the current command value generating larger motor torque.

It is hereinafter explained the operation and the result of the electrical power steering apparatus 10 according to the present invention.

By the above-mentioned constructions, when the collision is occurred in the vehicle equipping the electrical power steering apparatus 10 using the high voltage battery 100, the control circuit 15 in the ECU 6 consisting of the motor control circuit changes the power source voltage supplying to the motor drive circuit 13 from the high voltage in the battery 100 to the low voltage of the output of the step-down circuit 16 supplied by the low voltage charge device 17. The low voltage charge device 17 is charged through the step-down circuit 16 in the normal operation, however the power change relay 18 is turned on after the power relay 11 is turned off because of the vehicle stop, thereby changing to the power source from the low voltage charge device 17 to the motor drive circuit 13. The CPU in the control circuit 15 detects the vehicle collision by the acceleration G of the detect signal from the acceleration sensor 8, thereby it is possible to change the electrical motor 1 to the low voltage drive. And also, it is possible to increase the amount of the current limit in each phase current of the electrical motor 1, thereby increasing the assist force.

Thereby, even though it is happened the collision of the vehicle using the high voltage for the electrical power steering apparatus, the operator does not receive electric shock because of change to the power source from the low voltage drive and the driver can operate smoothly steering wheel by assisting of the electrical power steering apparatus 10 without stopping steering assistance. As a result, it is certain to prevent the electric shock and to keep the safety drive by the driver, thereby the vehicle can be moved to a safety zone to be saved safely.

The electrical power steering apparatus according to the present invention can achieve to prevent the electric shock in the collision of the vehicle, to maintain the power assist and to save the vehicle safely.

While the invention has been described in detail with reference to the preferred embodiments, it will be apparent to those skilled in the art that the invention is not limited to the present embodiments, and that the invention may be realized in various other embodiments within the scope of the claims.

While the collision of the vehicle is detected by the acceleration sensor 8 equipped on the vehicle in the above-identified embodiment of the present invention, however it may be detected by an operation of an airbag, or other collision detection signal.

While the CPU in the control circuit 15 changes to the low voltage charge device 17 by detecting the direct current power VH after the power relay 11 is turned off in the above-identified embodiment of the present invention, however the degradation of the power may be detected by other methods. For example, it can detect the power degradation of the motor drive power between the power line 19 and the earth line 20 by detecting the power of both ends of the smoothing condenser 12 by a power sensor or by detecting a power of both ends of a filter coil in a power filter circuit equipped in an input portion of the ECU 6.

While the power relay 11 and power change relay 18 is controlled to be ON or OFF by using a normal mechanical relay in the above-identified embodiment of the present invention, however it may be controlled by using a plurality of MOS-FETs as semiconductor switches being shut down bi-directionally.

While the CPU in the control circuit 15 changes from the high voltage of the high power battery 100 to the low voltage of the low voltage charge device 17 at the collision of the vehicle in the above-identified embodiment of the present invention, however it may be changed to a low voltage of a low voltage auxiliary battery. It may be changed to the direct current power VL by detecting a stoppage of supplying the power voltage of the battery 100 in parallel to detect the collision.

It may use the smoothing condenser C2 of the step-down circuit 16 as the low voltage charge device 17 in the above-identified embodiment of the present invention.

While the column assisted type of the electrical power steering apparatus is explained in the above-explained embodiment of the present invention, however it may be equipped a pinion assisted type or a rack assisted type electrical power steering apparatus.

What is claimed is:

1. An electrical power steering apparatus including;
   a high voltage power source generating a high voltage of more than 100 volts;
   an electrical motor generating steering assist force presented to a steering mechanism of a vehicle; and
   a motor control circuit, said motor control circuit including:
   a motor drive circuit including a plurality of switching elements supplying drive current to said electrical motor;
   a power relay opening and closing a conduct between said high voltage power source and said motor drive circuit;
   a converter division supplying power to said motor drive circuit; and
   a smoothing condenser absorbing any current ripple; wherein
   said converter division including a step down circuit reducing said high voltage of said high voltage power source to a low voltage lower than said high voltage, a low voltage charge device charged through said step down circuit, and a switch equipped to shut and connect a conduct between said low voltage charge device and said motor drive circuit; and
   said motor drive circuit is connected with said low voltage charge device, and is disconnected from a direct connection with said high voltage power source, when a collision of said vehicle occurs, so that steering assistance is still possible but a risk of electric shock to occupants of said vehicle is prevented.

2. An electrical power steering apparatus according to claim 1, wherein said control circuit discharges said voltage of said smoothing condenser by using said step down circuit and said motor drive circuit after said power relay is turned off at said collision of said vehicle, and turns on said switch to change to a power source from said low voltage charge device when a voltage supplying to said motor drive circuit is reduced to a predetermined low voltage.

3. An electrical power steering apparatus according to claim 2, wherein said control circuit increases a current limit value of said electrical motor after changing to said power source from said low voltage charge device.

4. An electrical power steering apparatus according to claim 3, wherein said control circuit detects said collision of said vehicle by a detecting signal from an acceleration sensor equipped on said vehicle, and turns off said power relay to close said conduct between said high voltage power and said motor drive circuit.

* * * * *